United States Patent
Inukai et al.

(10) Patent No.: US 9,511,433 B2
(45) Date of Patent: Dec. 6, 2016

(54) CONTROL APPARATUS AND MACHINING METHOD FOR WIRE ELECTRIC DISCHARGE MACHINE

(75) Inventors: Ken Inukai, Tokyo (JP); Hiroatsu Kobayashi, Tokyo (JP); Kyoichi Ebashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 108 days.

(21) Appl. No.: 14/391,027

(22) PCT Filed: Apr. 26, 2012

(86) PCT No.: PCT/JP2012/061251
§ 371 (c)(1),
(2), (4) Date: Oct. 7, 2014

(87) PCT Pub. No.: WO2013/161043
PCT Pub. Date: Oct. 31, 2013

(65) Prior Publication Data
US 2015/0094845 A1  Apr. 2, 2015

(51) Int. Cl.
*B23H 1/02* (2006.01)
*B23H 7/04* (2006.01)
(Continued)

(52) U.S. Cl.
CPC *B23H 1/02* (2013.01); *B23H 7/04* (2013.01); *B23H 7/20* (2013.01); *G05B 19/18* (2013.01); *G05B 2219/45221* (2013.01)

(58) Field of Classification Search
CPC .............. B23H 1/02; B23H 7/20; B23H 7/04; G05B 19/18; G05B 2219/45221
See application file for complete search history.

(56) References Cited

U.S. PATENT DOCUMENTS

| 5,038,011 A | 8/1991 | Nakayama |
| 5,556,554 A | 9/1996 | Morishita |
| 8,637,785 B2 | 1/2014 | Abe et al. |

FOREIGN PATENT DOCUMENTS

| DE | 4131650 A1 | 3/1993 |
| DE | 19503377 A1 | 1/1996 |

(Continued)

OTHER PUBLICATIONS

Communication dated Aug. 3, 2015 from the German Patent and Trademark Office in counterpart application No. 11 2012 006 087.3.
(Continued)

*Primary Examiner* — Carlos Ortiz Rodriguez
(74) *Attorney, Agent, or Firm* — Sughrue Mion, PLLC; Richard C. Turner

(57) ABSTRACT

A control apparatus of the present invention includes a weight calculating unit that calculates weight of a core on the basis of an NC program and a first input from a user designating a material and a thickness of work, a fixing-necessary-distance calculating unit that calculates a fixing distance on the basis of the weight of the core, a fixing-position calculating unit that sets fixing positions such that a total length of the fixing positions is equal to the fixing length, a fixation-condition setting unit that calculates a machining condition setting value for fixation on the basis of the first input, and a machine driving unit that drives the wire electric discharge machine on the basis of the NC program and causes the wire electric discharge machine to machine places set in the fixing positions by applying machining conditions for fixation.

9 Claims, 12 Drawing Sheets

(51) Int. Cl.
 B23H 7/20 (2006.01)
 G05B 19/18 (2006.01)

(56) References Cited

FOREIGN PATENT DOCUMENTS

| | | |
|---|---|---|
| JP | 57-096724 A | 6/1982 |
| JP | 61-41690 A | 2/1986 |
| JP | 61-061718 A | 3/1986 |
| JP | 62-218024 A | 9/1987 |
| JP | 01-240219 A | 9/1989 |
| JP | 02-131816 A | 5/1990 |
| JP | 05-004118 A | 1/1993 |
| JP | 5-212621 A | 8/1993 |
| JP | 8-019918 A | 1/1996 |
| JP | 2006-320999 A | 11/2006 |
| JP | 2008-100338 A | 5/2008 |
| JP | 2012-035363 A | 2/2012 |

OTHER PUBLICATIONS

Notice of Rejection for JP 2012-547352 dated Dec. 18, 2012.
International Search Report for PCT/JP2012/061251 dated Jul. 31, 2012.
Written Opinion for PCT/JP2012/061251 dated Jul. 31, 2012.

CONTROL APPARATUS AND MACHINING METHOD FOR WIRE ELECTRIC DISCHARGE MACHINE

CROSS REFERENCE TO RELATED APPLICATIONS

This application is a National Stage of International Application No. PCT/JP2012/061251 filed Apr. 26, 2012, the contents of all of which are incorporated herein by reference in their entirety.

FIELD

The present invention relates to a control apparatus that controls a wire electric discharge machine capable of performing machining for fixing a core and a machining method by the wire electric discharge machine.

BACKGROUND

As treatment of a core in machining the core with a wire electric discharge machine, there has been known a technology for transferring, while machining the core, an electrode component to a machining groove formed behind a wire electrode by the machining, filling the machining groove with the electrode component, and fixing the core, which should originally be separated from work, in the work (see, for example, Patent Literature 1). The machining by this technology is hereinafter referred to as fixation. By applying the fixation, it is possible to prevent the core from dropping from work during the machining. The core fixed to the work by the fixation is detached from the work when a physical impact is applied to the work after the work is detached from a machining table of the wire electric discharge machine.

CITATION LIST

Patent Literature

Patent Literature 1: Japanese Patent Application Laid-Open No. S57-96724

SUMMARY

Technical Problem

However, proper values of machining conditions for fixation and setting conditions for fixation such as a distance for performing the fixation (a fixing distance) and a position for performing the fixation (a fixing position) change according to various conditions such as the shape and the material of the core. For example, when the fixing distance is set to a value larger than an appropriate setting value, it is likely that the core cannot be detached after the machining. When the fixing distance is too small, because a fixing force is too small, for example, the core drops during the machining. An appropriate setting range of the fixing distance changes according to the weight of the core. In this way, there is a problem in that a skill of an operator is required to set the setting conditions for fixation to appropriate values.

The present invention has been devised in view of the above and it is an object of the present invention to obtain a control apparatus and a machining method that cause, with as simple setting as possible, a wire electric discharge machine to execute fixation.

Solution to Problem

In order to solve above-mentioned problems and achieve the object, a control apparatus according to the present invention includes a weight calculating unit that calculates weight of a core on the basis of a machining program for driving a wire electric discharge machine and slicing out the core from work and a first input from a user designating a material and a thickness of the work; a distance calculating unit that calculates, on the basis of the weight of the core, a necessary length in which fixation for fixing the core to the work is applied; a fixing-position setting unit that sets fixing positions in blocks for machining line segments forming an outer periphery of the core such that a total length of the fixing positions is the calculated necessary length; a fixation-condition setting unit that calculates a machining condition setting value for fixation on the basis of the first input; and a machine driving unit that drives the wire electric discharge machine on the basis of the machining program and causes the wire electric discharge machine to machine places set in the fixing positions by applying the machining condition setting value.

Advantageous Effects of Invention

The control apparatus according to the present invention automatically sets, when a user simply performs the first input, machining conditions for fixation and a fixing position and causes the wire electric discharge machine to carry out the fixation. Therefore, it is possible to cause, with as simple setting as possible, the wire electric discharge machine to execute the fixation.

BRIEF DESCRIPTION OF DRAWINGS

FIG. 3-1 is a diagram for explaining an example of a fixing position pattern.

FIG. 3-2 is a diagram for explaining an example of a fixing position pattern.

FIG. 3-3 is a diagram for explaining an example of a fixing position pattern.

FIG. 3-4 is a diagram for explaining an example of a fixing position pattern.

FIG. 4 is a diagram for explaining a functional configuration of a control apparatus in a first embodiment.

FIG. 6-1 is a diagram for explaining a method of representing fixing position information when a fixing position pattern 1 is designated.

FIG. 6-2 is a diagram for explaining a method of representing fixing position information when a fixing position pattern 2 is designated.

FIG. 13 is a diagram of a processing example of an NC program by a machine driving section in a third embodiment.

DESCRIPTION OF EMBODIMENTS

Embodiments of a control apparatus and a machining method for a wire electric discharge machine according to the present invention are explained in detail below with reference to the drawings. Note that the present invention is not limited by the embodiments.

First Embodiment

Figure 1:
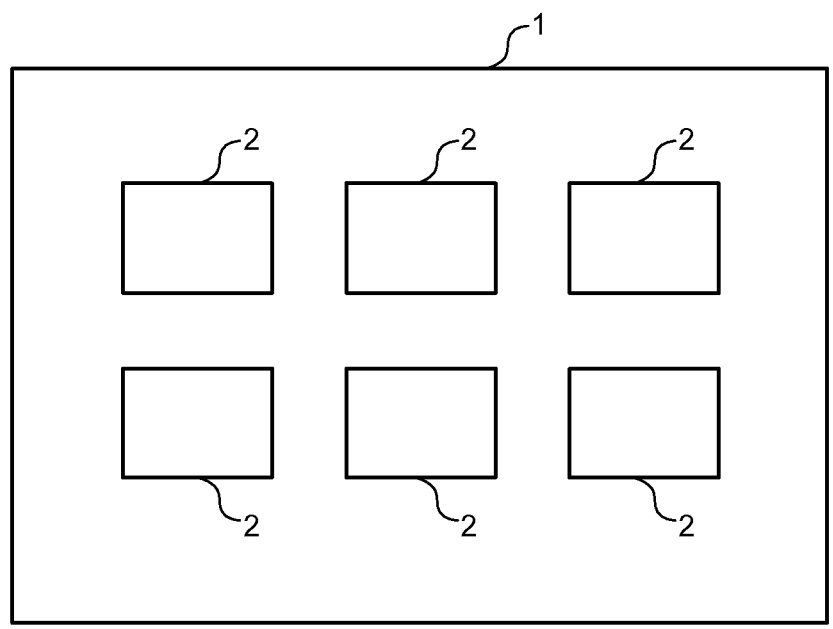
FIG. 1 is a diagram for explaining a machining example by a wire electric discharge machine.
Figure 2:
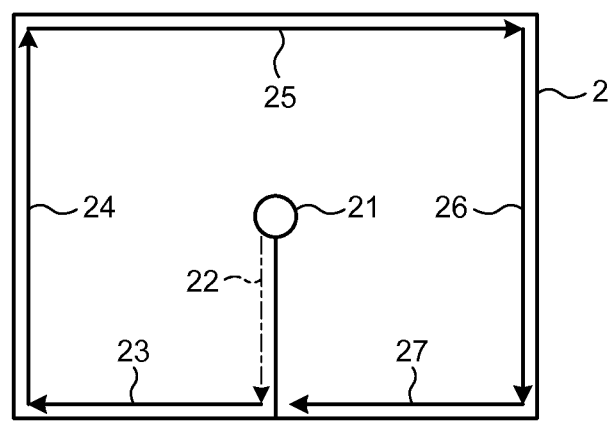
FIG. 2 is a diagram for explaining a machining example by the wire electric discharge machine.

FIG. 1 and FIG. 2 are diagrams for explaining a machining example by a wire electric discharge machine. As shown in FIG. 1, when a rectangular core 2 is cut off from rectangular work 1 to obtain a target shape, the core 2 is machined through, for example, a route shown in FIG. 2. That is, first, an approach hole 21 is formed and a wire electrode is inserted through the approach hole 21. Thereafter, machining of a block 22 is performed from the approach hole 21. Machining for approaching a side forming the core 2 is performed. Subsequently, sides forming the outer periphery of the core 2 are machined in the order of a block 23, a block 24, a block 25, a block 26, and a block 27.

When the machining of the blocks 23 to 27 is performed, inconvenience occurs in that the core 2 drops from the work 1 and collides with a lower guide mechanism of the wire electric discharge machine. Therefore, fixation is executed to prevent the core 2 from dropping from the work 1 during the machining. According to the first embodiment of the present invention, a control apparatus for the wire electric discharge machine can automatically execute condition setting for the fixation on the basis of only a shape of the core 2 and simple designation given from an NC machining program.

Figures 1, 3:
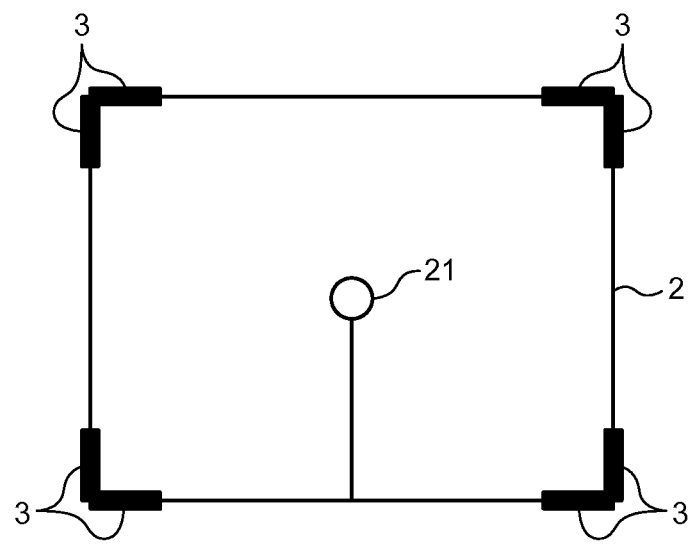
Figures 2, 3:
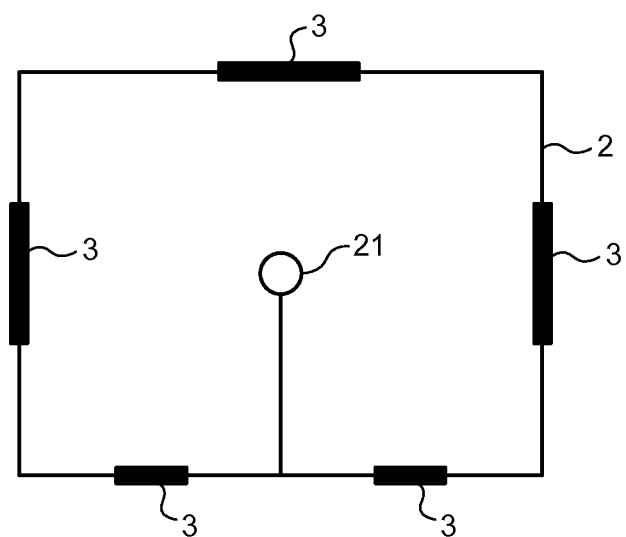
Figure 3:
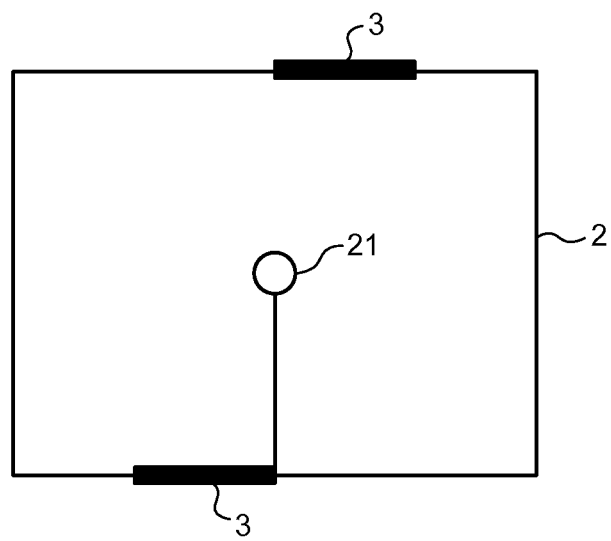
Figures 3, 4:
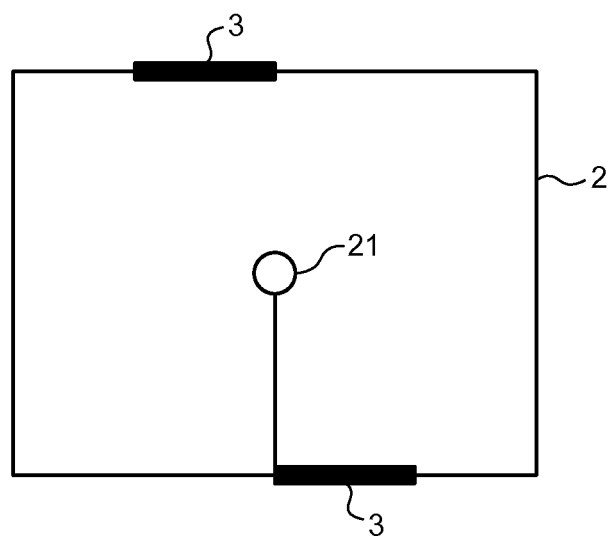
Figure 4:
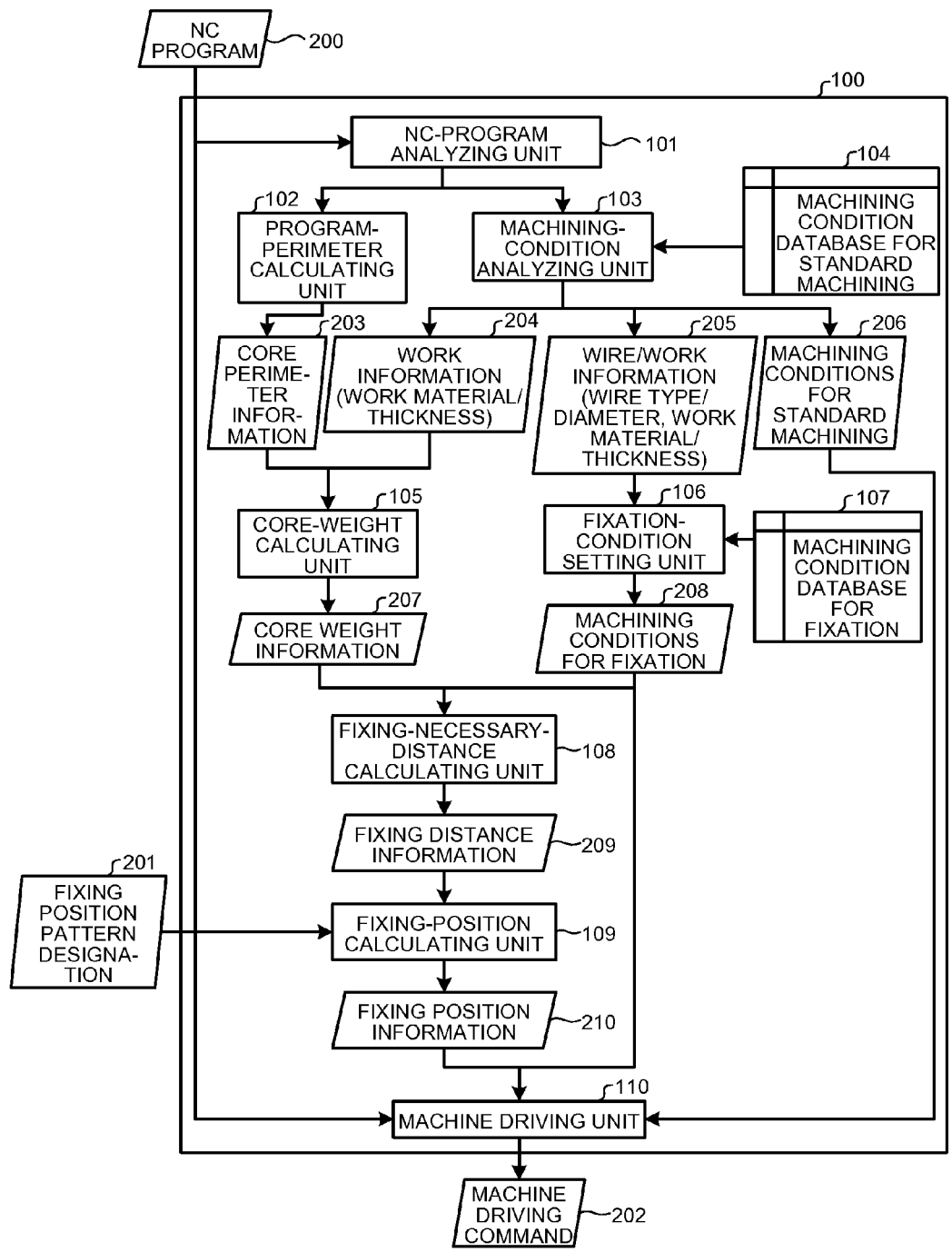

The control apparatus in the first embodiment can receive an input designating a pattern of a fixing position (a fixing position pattern) and performs the fixation with the received fixing position pattern. FIG. 3-1 to FIG. 3-4 are diagrams for explaining examples of fixing position patterns that can be designated. Lines 3 rendered by thick lines in FIG. 3-1 to FIG. 3-4 respectively indicate positions where the fixation is performed. FIG. 3-1 shows a fixing position pattern 1, FIG. 3-2 shows a fixing position pattern 2, FIG. 3-3 shows a fixing position pattern 3, and FIG. 3-4 shows a fixing position pattern 4. According to the fixing position pattern 1, the fixation is performed by a predetermined distance from end points of the respective blocks. For simplification, it is assumed that fixing positions set at the end points of the blocks respectively have the same lengths. According to the fixing position pattern 2, center portions excluding the end points and start points of the blocks are subjected to the fixation. According to the fixing position patterns 3 and 4, two places on a diagonal line of the core 2 are subjected to the fixation. Note that, according to the fixing position pattern 3, a portion on a start point side of the block 23 and a portion closer to the block 26 in a center portion of the block 25 are subjected to the fixation. According to the fixing position pattern 4, a portion closer to the block 24 in the center portion of the block 25 and a portion on an end point side of the block 27 are subjected to the fixation.

FIG. 4 is a diagram for explaining a functional configuration of the control apparatus in the first embodiment. As shown in the figure, an NC program (a machining program) 200 and fixing position pattern designation 201 for designating a fixing position pattern are input to a control apparatus 100. The control apparatus 100 can drive a wire electric discharge machine main body (not shown in the figure) on the basis of the NC program 200 and cause the wire electric discharge machine main body to execute the fixation with the designated fixing position pattern. The control apparatus 100 sequentially outputs a machine driving command 202 for executing positioning of a motor that moves a machining position of the wire electric discharge machine main body and power supply control for discharge machining.

The control apparatus 100 includes an NC-program analyzing unit 101, a program-perimeter calculating unit 102, a machining-condition analyzing unit 103, a machining condition database for standard machining 104, a core-weight calculating unit 105, a fixation-condition setting unit 106, a machining condition database for fixation 107, a fixing-necessary-distance calculating unit 108, a fixing-position calculating unit 109, and a machine driving unit 110.

The machining condition database for standard machining 104 is a database that records optimum values for subjecting the work 1 to standard machining (machining excluding the fixation, for example, rough machining and finishing). Specifically, in the machining condition database for standard machining 104, optimum values of machining conditions for the standard machining are recorded for each of combinations of wire types, wire diameters, work materials, and work thicknesses. The machining conditions for the standard machining include, for example, parameters of power supply control, wire tension, wire feeding speed, and adaptive control, an amount for offsetting an axis movement track from a program track, and speed of axis movement. Note that these items enumerated as the machining conditions for the standard machining are an example and may be more or may be less. The machining conditions may include other items. Respective entries forming the machining condition database for standard machining 104 can be designated from the NC program 200 according to identification information. That is, a user can substantially designate a combination of a wire type, a wire diameter, a work material, and a work thickness via the NC program 200.

The NC-program analyzing unit 101 analyzes the input NC program 200 and reads out blocks for machining (machining blocks) and identification information for machining conditions described in the NC program 200. The identification information for machining conditions is information for designating the entries of the machining condition database for standard machining 104. The machining blocks are input to the program-perimeter calculating unit 102. The identification information for machining conditions is input to the machining-condition analyzing unit 103.

Figure 5:
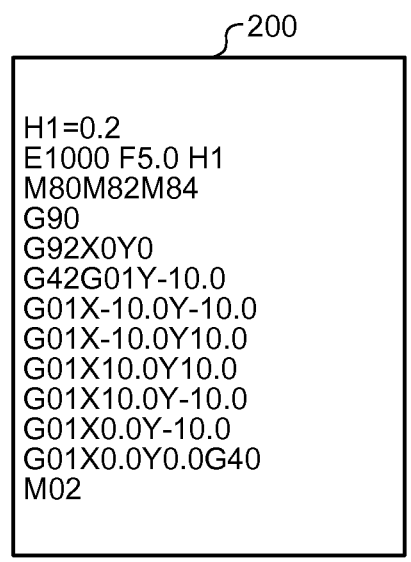
FIG. 5 is a diagram of a description example of an NC program.

FIG. 5 is a diagram of a description example of the NC program 200. In the figure, "E1000" described in a second row of the NC program 200 corresponds to the identification information for machining conditions. A row starting with "G01" corresponds to the machining blocks.

The program-perimeter calculating unit 102 removes a block for approaching a side forming the core 2 and blocks other than blocks for rough machining to calculate a perimeter of the core 2 (core perimeter information 203). The program-perimeter calculating unit 102 inputs the calculated core perimeter information 203 to the core-weight calculating unit 105.

The machining-condition analyzing unit 103 reads out an entry corresponding to the identification information for machining conditions described in the NC program 200 from the machining condition database for standard machining 104. Among various kinds of information forming the read-out entry, the machining-condition analyzing unit 103 inputs the material and the thickness of work (work information 204) to the core-weight calculating unit 105, inputs a combination of a wire type, a wire diameter, a work material, and a work thickness (wire/work information 205) to the fixation-condition setting unit 106, and inputs machining conditions for standard machining (machining conditions for standard machining 206) to the machine driving unit 110.

The core-weight calculating unit 105 calculates weight of the core on the basis of the core perimeter information 203 and the work information 204 and inputs the calculated weight (core weight information 207) to the fixing-necessary-distance calculating unit 108.

The machining condition database for fixation 107 is a database that record optimum values for subjecting the work 1 to the fixation. Specifically, in the machining condition database for fixation 107, one or both of wire types and diameters are recorded and optimum values of machining conditions for fixation are recorded for each of combinations of the wire types, the wire diameters, work materials, and work thicknesses. The machining conditions for fixation include items same as the items recorded in the machining condition database for standard machining 104.

The fixation-condition setting unit 106 searches through the machining condition database for fixation 107 using the input wire/work information 205 as a search key and obtains machining conditions for fixation (machining conditions for fixation 208). The fixation-condition setting unit 106 inputs the obtained machining conditions for fixation 208 to the fixing-necessary-distance calculating unit 108 and the machine driving unit 110.

The fixing-necessary-distance calculating unit 108 calculates, on the basis of the core weight information 207 and the machining conditions for fixation 208, a total distance in which the fixation for one core 2 is necessary and inputs the calculated distance (fixing distance information 209) to the fixing-position calculating unit 109. A relation among core weight, machining conditions for fixation, and a distance in which the fixation is necessary can retained in advance in the fixing-position calculating unit 109 as a lookup table and a numerical formula for specifying the relation among the items. The fixing-position calculating unit 109 can calculate a distance using the lookup table and the numerical formula. Note that the machining conditions for fixation 208 are used for calculating of a fixing distance because the machining conditions for fixation affects a force for fixing the core 2. When the machining conditions for fixation 208 with a weak fixing force is set, a fixing distance is calculated rather long. When the machining conditions for fixation 208 with a strong fixing force is set, a fixing distance is calculated rather short.

The fixing-position calculating unit 109 sets fixing positions in the blocks 23 to 27 forming the outer periphery of the core 2 such that the fixation can be carried out with a fixing position pattern designated by the fixing positioning pattern designation 201 and a total of distances for performing the fixation is a distance described in the fixing distance information 209. The fixing-position calculating unit 109 inputs information indicating setting content of the fixing positions (fixing position information 210) to the machine driving unit 110.

For example, when the fixing position pattern 1 is designated, the fixing-position calculating unit 109 divides the distance described in the fixing distance information 209 by a value "8" and sets fixing positions at distances obtained by the division in respective start points and end points of the blocks 23 to 27. When the fixing position pattern 2 is designated, the fixing-position calculating unit 109 divides the distance described in the fixing distance information 209 by a value "4", which is the number of sides, and sets fixing positions at distances obtained by the division in respective center portions of the blocks 23 to 27.

Note that the fixing-position calculating unit 109 can execute exceptional processing for a side that the block 22 for approach approaches (i.e., a side formed by the block 23 and the block 27). Specifically, when the fixing position pattern 1 is designated, the fixing-position calculating unit 109 sets a fixing position only at the end point of the block 23 and sets a fixing position only at the start point of the block 27. When the fixing position pattern 2 is designated, the fixing-position calculating unit 109 further divides, by a value "2", the value obtained by dividing the distance described in the fixing distance information 209 by the value "4" and sets fixing positions at obtained distances respectively in the center portions of the block 23 and the block 27.

The fixing-position calculating unit 109 can describe the setting content of the fixing positions in the fixing position information 210, for example, as explained below.

Figures 1, 6:
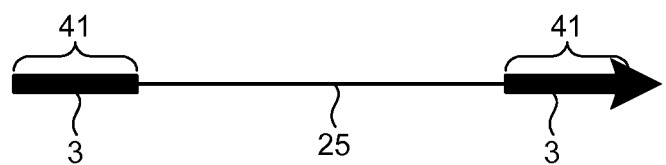
Figures 2, 6:
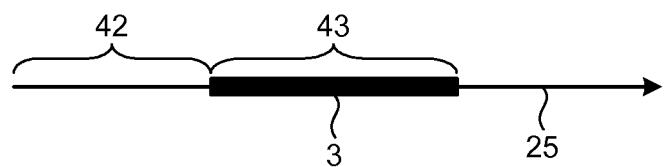

FIG. 6-1 is a diagram for explaining a method of representing the fixing position information 210 when the fixing position pattern 1 is designated. As shown in the figure, when the fixing position pattern 1 is designated, for example, concerning the block 25, it is possible to specify fixing positions of the block 25 simply by designating a distance (a distance 41) for executing the fixation at end points. The fixing position information 210 includes information for specifying a block, information indicating that the fixing position pattern 1 is designated, and a value of the distance 41. Note that, when the distance 41 is common to all the blocks excluding an exceptional processing target block, the information for specifying a block can be omitted for the blocks excluding the exceptional processing target block. In the following explanation, the distance 41 described in the fixing position information 210 is referred to as designated distance 41.

FIG. 6-2 is a diagram for explaining a method of representing the fixing position information 210 when the fixing position pattern 2 is designated. When the fixing position pattern 2 is designated, for example, concerning the block 25, it is possible to specify fixing positions of the block 25 with a distance (a distance 42) from a start point to a position where the fixation is started and a distance (a distance 43) indicating a range in which the fixation is executed. Therefore, the fixing position information 210 includes information for specifying a block, information indicating that the fixing pattern 2 is designated, the distance 42, and the distance 43. In the following explanation, the distance 42 described in the fixing position information 210 is referred to as a first designated distance 42 and the distance 43 described in the fixing position information 210 is referred to as a second designated distance 43.

The machine driving unit 110 receives inputs of the NC program 200, the machining conditions for standard machining 206, the machining conditions for fixation 208, and the fixing position information 210, generates the machine driving command 202, and drives the wire electric discharge machine main body. The machine driving unit 110 machines, using the machining conditions for fixation 208, a place set as a fixing position by the fixing position information 210 and machines the other places using the machining conditions for standard machining 206.

Figure 7:
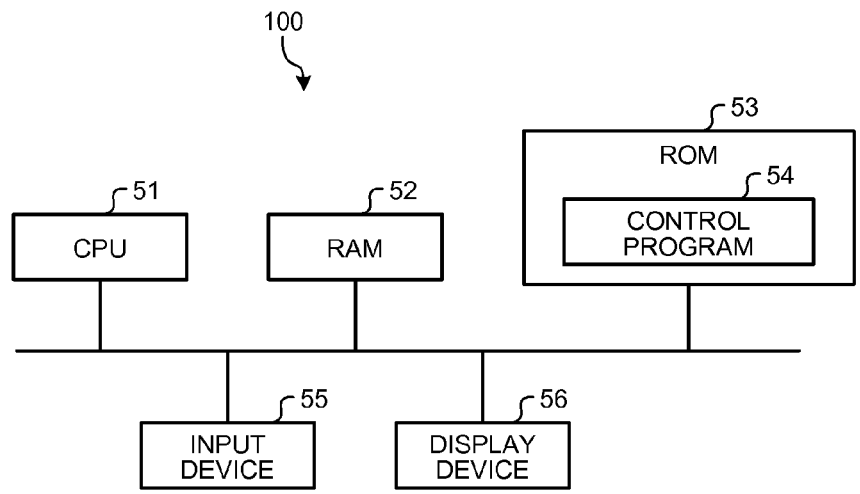
FIG. 7 is a diagram of a hardware configuration example of the control apparatus in the first embodiment.

FIG. 7 is a diagram of a hardware configuration example of the control apparatus 100. The control apparatus 100 includes a CPU (Central Processing Unit) 51, a RAM (Random Access Memory) 52, a ROM (Read Only Memory) 53, an input device 55, and a display device 56. The CPU 51, the RAM 52, the ROM 53, the input device 55, and the display device 56 are connected to one another via a bus line.

The display device 56 is a device capable of displaying information configured by, for example, a liquid crystal monitor. The display device 56 displays a display screen for a user. The input device 55 includes, for example, a mouse and a keyboard. Operation information concerning the control apparatus 100 and the fixing position pattern designation 201 from the user are input to the input device 55. The input various kinds of information is sent to the CPU 51. The NC program 200 is input from, for example, a not-shown external storage device and sent to the CPU 51.

The ROM 53 is a recording medium that records a control program 54. The CPU 51 reads out the control program 54 from the ROM 53 via the bus line, loads the control program 54 to the RAM 52, and executes the control program 54 loaded in the RAM 52. The control program 54 is loaded to the RAM 52, whereby the NC-program analyzing unit 101, the program-perimeter calculating unit 102, the machining-condition analyzing unit 103, the core-weight calculating unit 105, the fixation-condition setting unit 106, the fixing-necessary-distance calculating unit 108, the fixing-position calculating unit 109, and the machine driving unit 110 are generated on the RAM 52. The RAM 52 includes, besides a program expansion region for the control program 54, a work area in which intermediate data generated according to the execution of the control program 54 is stored. For example, the core perimeter information 203, the work information 204, the wire/work information 205, the machining conditions for standard machining 206, the core weight information 207, the machining conditions for fixation 208, the fixing distance information 209, and the fixing position information 210 correspond to the intermediate data stored in the work area. The machining condition database for standard machining 104 and the machining condition database for fixation 107 are realized with regions corresponding to the RAM 52, the ROM 53, or the external storage device secured therein.

Note that the control program 54 may be provided or distributed through a network such as the Internet. Instead of the ROM 53, any recording medium can be adopted as a recording medium, from which the control program 54 is loaded, as long as the recording medium a non-temporary tangible medium. For example, external storage device, a detachable memory device, and an optical disk device can be adopted.

A machining method realized by the control apparatus 100 in the first embodiment of the present invention is explained.

Figure 8:
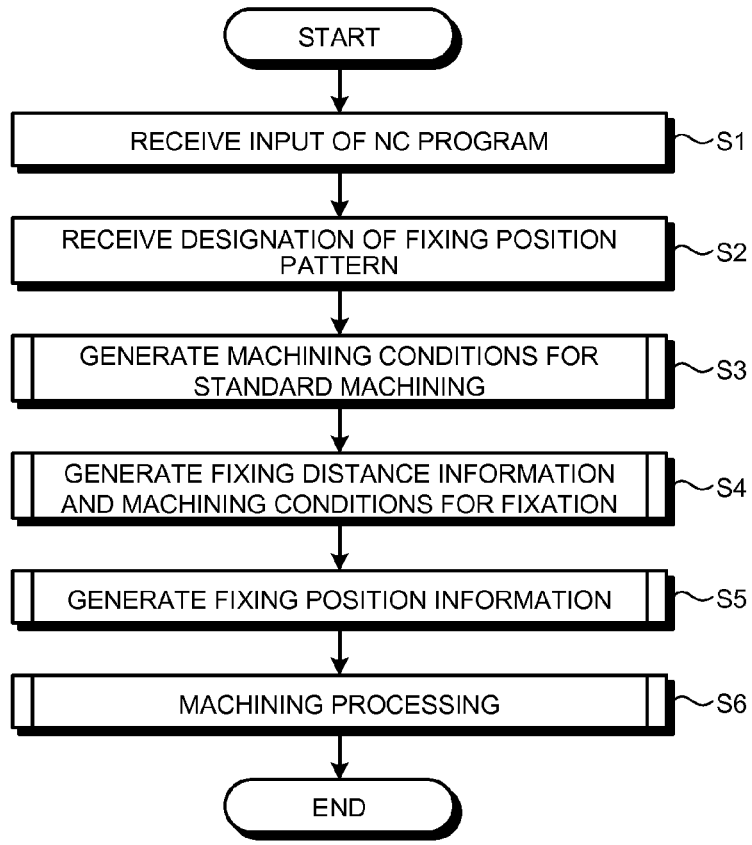
FIG. 8 is a flowchart for explaining the operation of the control apparatus in the first embodiment.

FIG. 8 is a flowchart for explaining the operation of the control apparatus 100. As shown in the figure, the control apparatus 100 receives an input of the NC program 200 (step S1) and subsequently receives an input of the fixing position pattern designation 201 (step S2).

The control apparatus 100 may display a figure for explaining an overview of the fixing position patterns 1 to 4 on the display device 56 as a legend and urge the user to perform an input for selecting one of the fixing position patterns 1 to 4 out of the legend.

Figure 9:
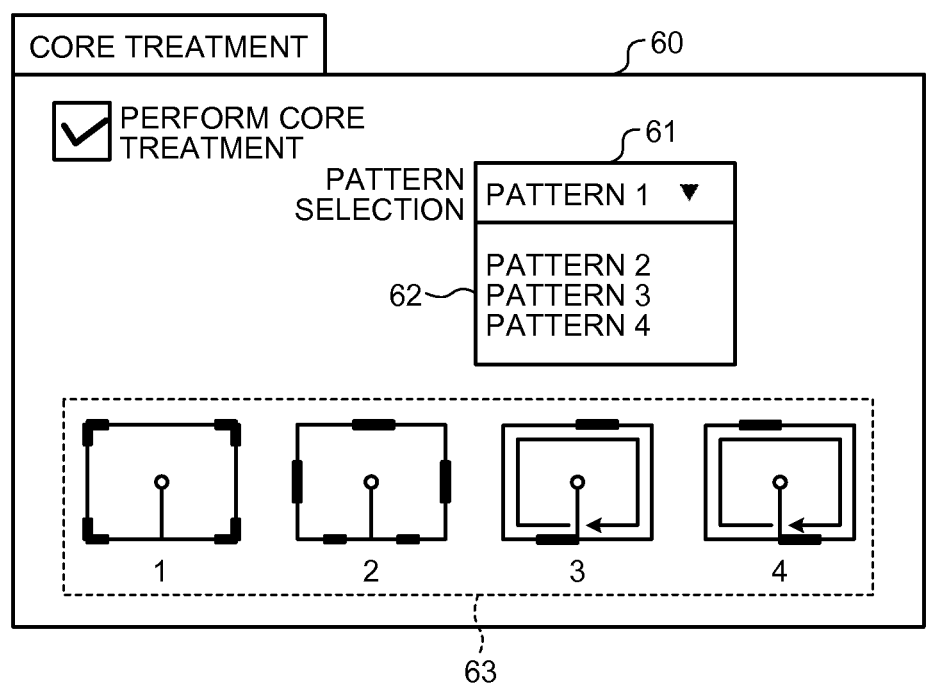
FIG. 9 is a diagram of a display screen example for urging a user to input fixing position pattern designation.

FIG. 9 is a diagram of a display screen example for urging the user to input the fixing position pattern designation 201. As shown in the figure, a box 61 for inputting a fixing position pattern and a legend 63 are displayed on the display screen 60. When an inverted triangle button displayed at the right end of the box 61 is pressed using a pointing device included in the input device 55, the control apparatus 100 generates a pull-down menu 62 under the box 61 and displays a list of selectable fixing position patterns in the pull-down menu 62. When the user selects one of the fixing patterns 1 to 4 displayed in the pull-down menu 62, the control apparatus 100 can display the selected fixing position pattern in the box 61 and recognize that an input designating the fixing position pattern is performed.

Subsequent to step S2, the control apparatus 100 generates the machining conditions for standard machining 206 (step S3). Specifically, the NC-program analyzing unit 101 reads out machining blocks and identification information for machining conditions from the NC program 200. The machining-condition analyzing unit 103 extracts, using the read-out identification information, an entry corresponding to the identification information from the machining condition database for standard machining 104. The machining-condition analyzing unit 103 reads out the machining conditions for standard machining 206 from the extracted entry.

Subsequently, the control apparatus 100 generates the fixing distance information 209 and the machining conditions for fixation 208 (step S4). Specifically, the fixation-condition setting unit 106 searches through the machining condition database for fixation 107 using the wire/work information 205 as a search key and obtains the machining conditions for fixation 208. On the other hand, the program-perimeter calculating unit 102 generates the core perimeter information 203 on the basis of the machining blocks read out by the NC-program analyzing unit 101. The core-weight calculating unit 105 calculates the core weight information 207 on the basis of the core perimeter information 203 and the work information 204. The fixing-necessary-distance calculating unit 108 calculates the fixing distance information 209 on the basis of the core weight information 207 and the machining conditions for fixation 208.

Subsequently, the control apparatus 100 generates the fixing position information 210 (step S5). Specifically, the fixing-position calculating unit 109 calculates the fixing position information 210 on the basis of the fixing position pattern designation 201 and the fixing distance information 209.

The control apparatus 100 executes machining processing (step S6). Specifically, the machine driving unit 110 generates, on the basis of the NC program 200, the machining conditions for standard machining 206, the machining conditions for fixation 208, and the fixing position information 210, the machine driving command 202 for driving the wire electric discharge machine main body. Upon ending the machining processing, the control apparatus 100 ends the operation.

Figure 10:
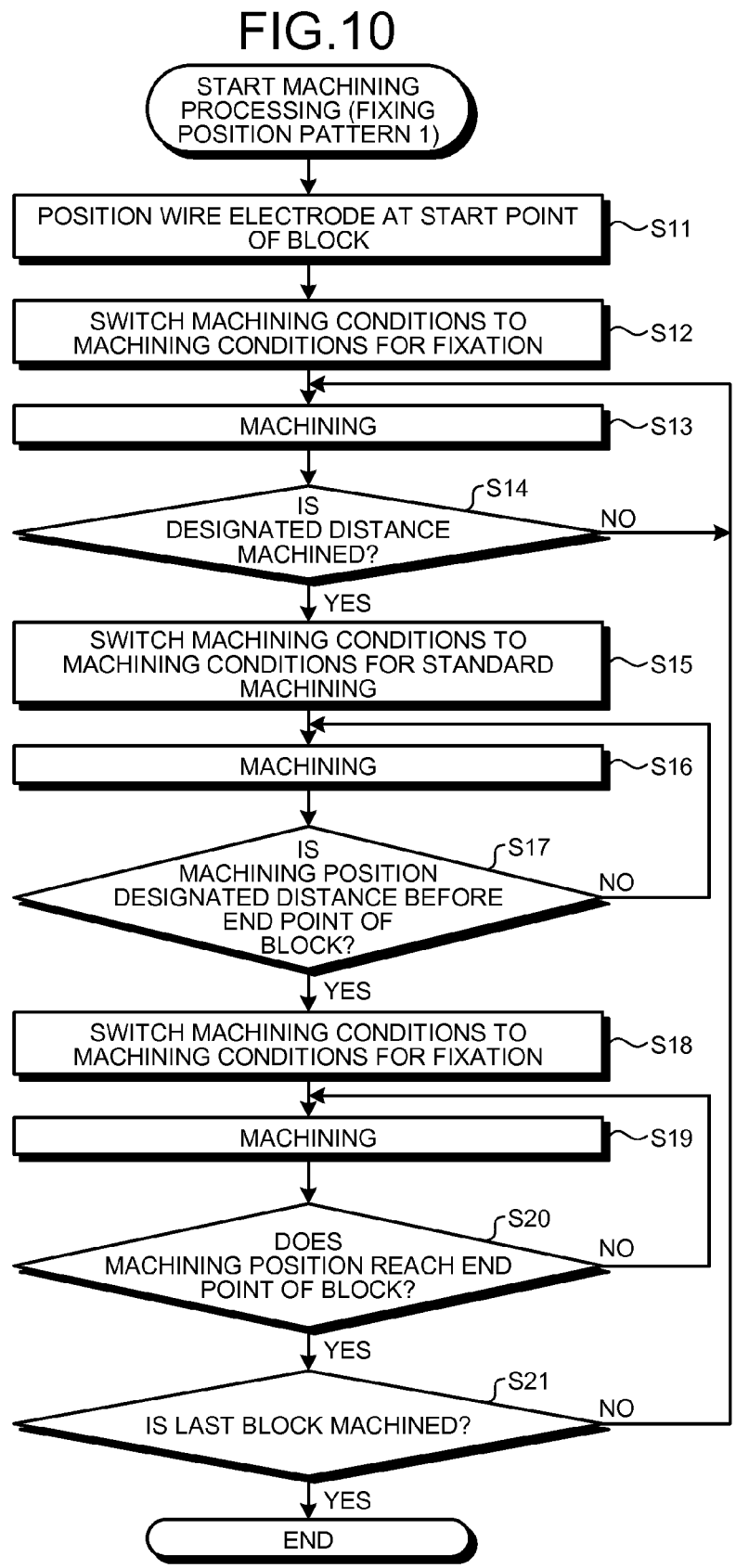
FIG. 10 is a flowchart for explaining machining processing executed when the fixing position pattern 1 is designated.

FIG. 10 is a flowchart for explaining machining processing executed when the fixing position pattern 1 is designated. First, the machine driving unit 110 positions the wire electrode at a start point of a block (step S11). Note that, in the explanation, machining of the approach hole 21 and the block 22 is omitted. That is, the start point means a start point of the block 23.

Subsequently, the machine driving unit 110 switches machining conditions to the machining conditions for fixation (step S12) and executes machining under the machining conditions for fixation (step S13). Subsequently, the machine driving unit 110 determines whether the machining is completed from a start point of a block currently being machined to the designated distance 41 (step S14). When the machining is not completed from the start point to the designated distance 41 (No at step S14), the machine driving unit 110 executes the processing at step S13 again. Note that the determination processing at step S14 may be executed at every predetermined calculation cycle.

When the machining is completed from the start point of the block currently being machined to the designated distance 41 (Yes at step S14), the machine driving unit 110 switches the machining conditions to the machining conditions for standard machining (step S15) and executes machining under the machining conditions for standard machining (step S16). The machine driving unit 110 determines whether a machining position reaches a position the designated distance 41 before an end point of a block currently being machined (step S17). When the machining position does not reach the position the designated distance 41 before the end point (No at step S17), the machine driving unit 110 executes the processing at step S16 again.

When the machining position reaches the position the designated distance 41 before the end point of the block currently being machined (Yes at step S17), the machine driving unit 110 switches the machining conditions to the machining conditions for fixation (step S18) and executes machining under the machining conditions for fixation (step S19). Subsequently, the machine driving unit 110 determines whether the machining position reaches the end point of the block currently being machined (step S20). When the machining position does not reach the end point (No at step S20), the machine driving unit 110 executes the processing at step S19 again.

When the machining position reaches the end point (Yes at step S20), the machine driving unit 110 determines whether machining of a last block (the block 27) is completed (step S21). When the machining of the last block is not completed (No at step S21), the machine driving unit 110 shifts to the processing at step S13 and starts the machining under the machining conditions for fixation from a start point of the next block. When the machining of the last block is completed (Yes at step S21), the machine driving unit 110 ends the machining processing.

However, concerning a block for which exceptional processing is set, the machine driving unit 110 performs the machining processing on the basis of a processing flow different from the processing flow explained above. Specifically, when machining the block 23, the machine driving unit 110 omits the processing at step S12 to step S15. When machining the block S27, the machine driving unit 110 omits the processing at step S16 to step S18.

Figure 11:
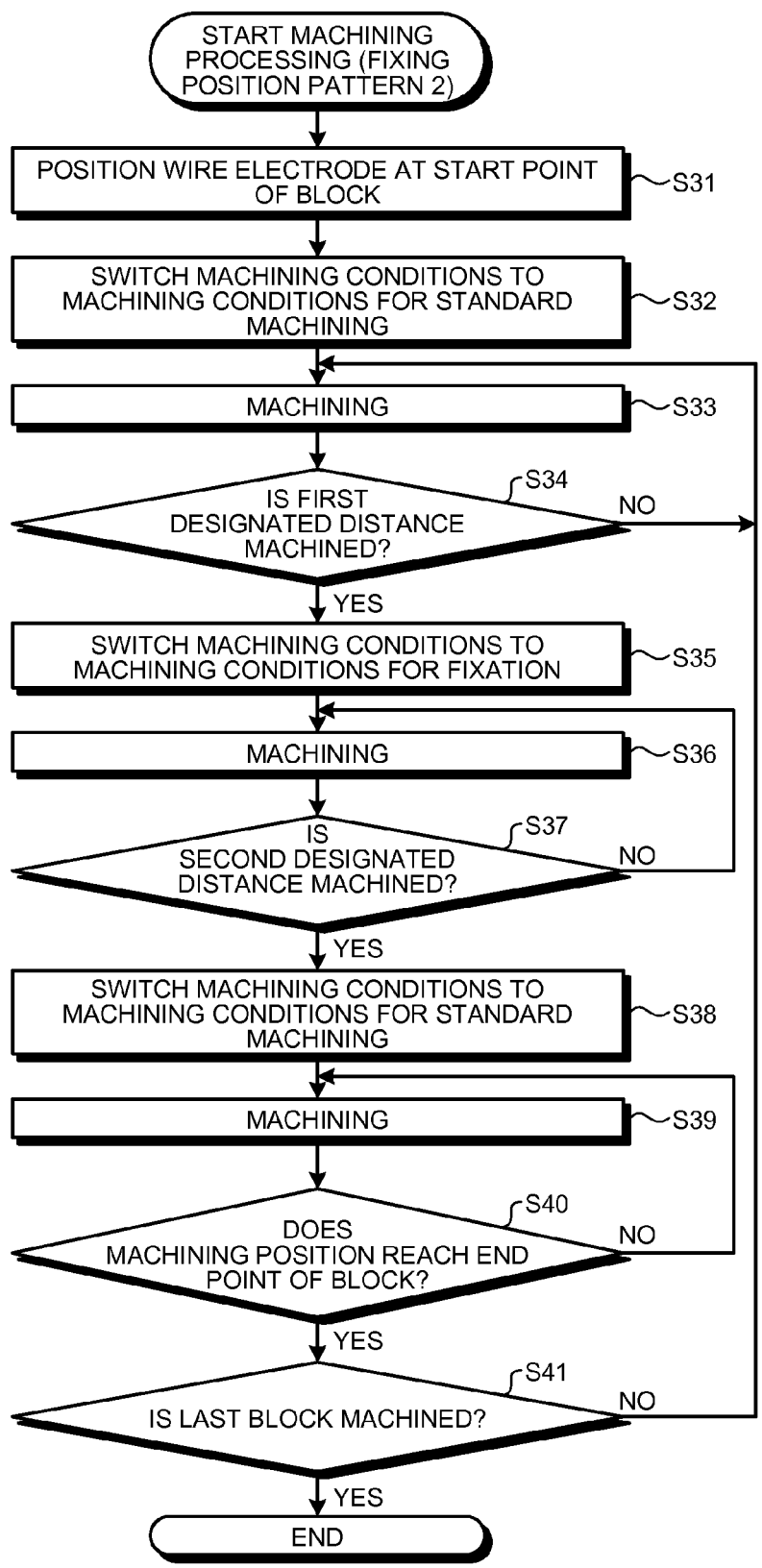
FIG. 11 is a flowchart for explaining machining processing executed when the fixing position pattern 2 is designated.

FIG. 11 is a flowchart for explaining machining processing executed when the fixing position pattern 2 is designated. When the fixing position pattern 2 is designated, first, the machine driving unit 110 positions the wire electrode at a start point of a block (step S31).

Subsequently, the machine driving unit 110 switches machining conditions to the machining conditions for standard machining (step S32) and executes machining under the machining conditions for standard machining (step S33).

Subsequently, the machine driving unit 110 determines whether the machining is completed from a start point of a block currently being machined to the first designated distance 42 (step S34). When the machining is not completed from the start point to the first designated distance 42 (No at step S34), the machine driving unit 110 executes the processing at step S33 again.

When the machining is completed from the start point of the block currently being machined to the first designated distance 42 (Yes at step S34), the machine driving unit 110 switches the machining conditions to the machining conditions for fixation (step S35) and executes machining under the machining conditions for fixation (step S36). The machine driving unit 110 determines whether a distance machined after the processing at step S36 is executed reaches the second designated distance 43 (step S37). When the machined distance does not reach the second designated distance 43 (No at step S37), the machine driving unit 110 executes the processing at step S36 again.

When the distance machined after the processing at step S36 is executed reaches the second designated distance 43 (Yes at step S37), the machine driving unit 110 switches the machining conditions to the machining conditions for standard machining (step S38) and executes machining under the machining conditions for standard machining (step S39). Subsequently, the machine driving unit 110 determines whether a machining position reaches an end point of the block currently being machined (step S40). When the machining position does not reach the end point (No at step S40), the machine driving unit 110 executes the processing at step S39 again.

When the machining position reaches the end point (Yes at step S40), the machine driving unit 110 determines whether machining of a last block is completed (step S41). When the machining of the last block is not completed (No at step S41), the machine driving unit 110 shifts to the processing at step S33 and starts the machining under the machining conditions for standard machining from a start point of the next block. When the machining of the last block is completed (Yes at step S41), the machine driving unit 110 ends the machining processing.

Note that, in the above explanation, the machining processing executed when the fixing position pattern 1 is designated and the machining processing executed when the fixing position pattern 2 is designated are explained. However, the machine driving unit 110 can also carry out the machining processing when the fixing position pattern 3 or the fixing position pattern 4 is designated. Specifically, for example, when the fixing position pattern 3 is designated, the fixing-position calculating unit 109 represents a fixing position of the block 25 according to an representation method same as the representation method for the fixing position pattern 1 and represents a fixing position of the block 23 according to the representation method explained as the exceptional processing for the fixing position pattern 1. Then, the machine driving unit 110 can execute machining according to a processing flow same as the processing flow of machining executed when the fixing position pattern 1 is designated. When the fixing position pattern 4 is designated, the machine driving unit 110 can execute the machining processing using a method same as the method used when the fixing position pattern 3 is designated.

The machining condition databases 104 and 107 include a data structure in which optimum values of machining conditions are recorded for each of combinations of wire types, wire diameters, work materials, and work thicknesses. The identification information for machining conditions included in the NC program 200 designates entries of the machining condition databases 104 and 107. Therefore, describing the identification information in the NC program 200 is substantially equal to performing an input (a first input) designating a wire type, a wire diameter, a work material, and a work thickness. The machining condition databases 104 and 107 can include a data structure in which machining conditions are recorded for each of combinations of values of items including work materials and work thicknesses. The first input can be an input designating items including a work material and a work thickness. By adding a wire type and a wire diameter to search keys of the machining condition databases 104 and 107 and designated items of the first input, it is possible to calculate more appropriate machining conditions 206 and 208.

Note that the first input is described in the NC program 200 and input. However, the first input can be input separately from the NC program 200.

A relation between the values of the designated items of the first input and the machining conditions for fixation is explained as being recorded in the machining condition database for fixation 107 in advance. However, the fixation-condition setting unit 106 can store in advance a numerical formula for calculating machining conditions for fixation using the values of the designated items of the first input as parameters and calculate machining conditions for fixation on the basis of the numerical formula.

The fixing-necessary-distance calculating unit 108 can increase or reduce a fixing distance necessary for the fixation according to a designated fixing position pattern. The fixing position pattern 1 supports the core 2 at four points. The fixing position pattern 2 supports the core 2 at five points. As places where the core 2 is supported increases, the core 2 can be more stably supported. Therefore, for example, the fixing-necessary-distance calculating unit 108 can calculate the fixing distance smaller as the places where the core 2 is supported are more.

As explained above, according to the first embodiment of the present invention, the control apparatus 100 includes the program-perimeter calculating unit 102 and the core-weight calculating unit 105 functioning as a weight calculating unit that calculates weight of the core on the basis of the NC program 200 and the first input from the user designating a material and a thickness of work, the fixing-necessary-distance calculating unit 108 functioning as a distance calculating unit that calculates, on the basis of the weight of the core 2, a fixing distance in which the fixation is necessary (in other words, a necessary length in which the fixation is applied), the fixing-position calculating unit 109 functioning as a fixing-position setting unit that sets fixing positions in blocks for machining line segments forming the outer periphery of the core 2 such that a total length of the fixing positions is equal to the fixing distance, the fixation-condition setting unit 106 that calculates machining condition setting values for fixation on the basis of the first input, and the machine driving unit 110 that drives the wire electric discharge machine on the basis of the NC program 200 and causes the wire electric discharge machine to machine places set in the fixing position by applying machining conditions for fixation. Therefore, when the user simply performs the first input, the control apparatus 100 automatically sets machining conditions for fixation and fixing positions and causes the wire electric discharge machine to execute the fixation. Therefore, the user can perform various kinds of setting for the fixation without having knowhow. That is, the user can cause, with as simple setting as possible, the wire electric discharge machine to execute the fixation.

The fixing-position calculating unit 109 receives the fixing position pattern designation from the user and sets fixing positions in places corresponding to the designated fixing position pattern. Therefore, the user can cause the wire electric discharge machine to execute the fixation in a desired fixing position pattern.

Second Embodiment

According to the first embodiment, the control apparatus is explained as calculating the fixing distance information 209 using the machining conditions for fixation 208. However, the control apparatus can calculate the machining conditions for fixation 208 first and calculate the fixing distance information 209 using the calculated machining conditions for fixation 208. Specifically, when a block is too short and a fixing distance for obtaining a sufficient fixing force cannot be set in the block, a control apparatus in a second embodiment can correct machining conditions to increase a fixing amount to be larger than a normal fixing amount.

Figure 12:
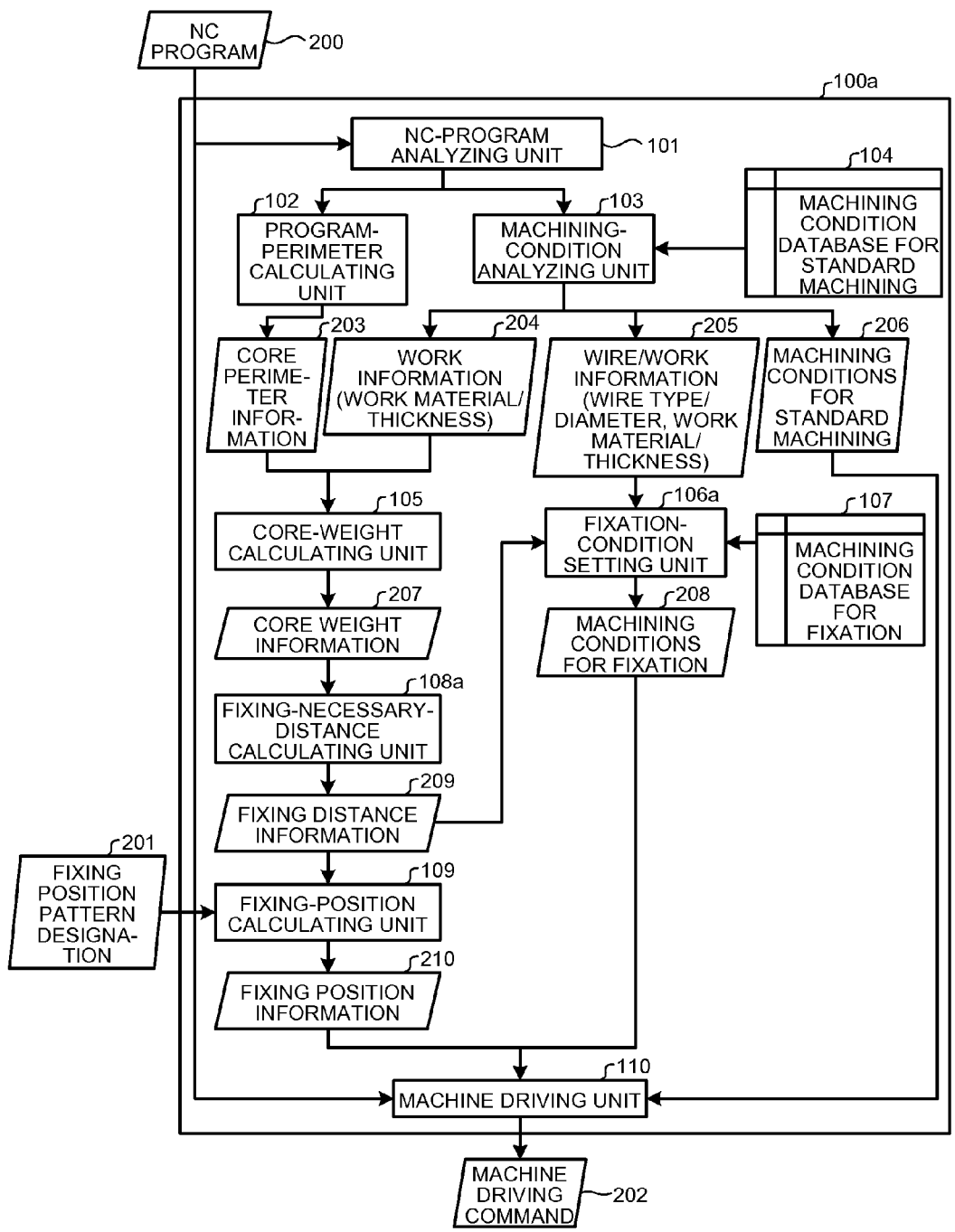
FIG. 12 is a diagram for explaining a functional configuration of a control apparatus in a second embodiment.

FIG. 12 is a diagram for explaining a functional configuration of the control apparatus in the second embodiment. Components having functions same as the functions in the first embodiment are denoted by reference numerals and signs same as the reference numerals and signs in the first embodiment and redundant explanation of the components is omitted.

A control apparatus 100a in the second embodiment includes the NC-program analyzing unit 101, the program-perimeter calculating unit 102, the machining-condition analyzing unit 103, the machining condition database for standard machining 104, the core-weight calculating unit 105, a fixation-condition setting unit 106a, the machining condition database for fixation 107, a fixing-necessary-distance calculating unit 108a, the fixing-position calculating unit 109, and the machine driving unit 110.

The fixing-necessary-distance calculating unit 108a calculates a fixing distance on the basis of only the core weight information 207 and outputs the fixing distance information 209.

The fixation-condition setting unit 106a searches through the machining condition database for fixation 107 using the input wire/work information 205 as a search key and extracts machining conditions. Thereafter, the fixation-condition setting unit 106a corrects the extracted machining conditions on the basis of the fixing distance information 209 and generates the machining condition for fixation 208.

A machining method for performing machining using the control apparatus 100a in the second embodiment is different from the machining method in the first embodiment only in the operation at step S4. Therefore, explanation of the machining method is omitted.

As explained above, the control apparatus 100a can also be configured to calculate the machining conditions for fixation 208 first and calculate the fixing distance information 209 using the calculated machining conditions for fixation 208.

Third Embodiment

Note that, in the control apparatuses in the first and second embodiments, the machine driving unit 110 can once process the NC program 200 on the basis of the fixing position information 210 and drive the wire electric discharge machine on the basis of the processed NC program 200 and the machining conditions 206 and 208.

Figure 13:
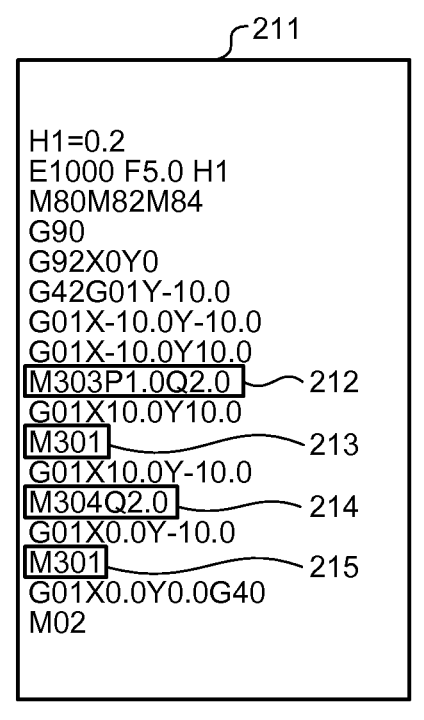

FIG. 13 is a diagram of a processing example of the NC program 200 by the machine driving unit 110 in the third embodiment. Note that the processing example is processing of the NC program 200 shown in FIG. 5. In a processed NC program 211, a block 212, a block 213, a block 214, and a block 215 are inserted into the NC program 200. In "M303P1.0Q2.0" shown in the block 212, "M303" is a command for setting machining related to the following "G01" command as fixation in the fixing position pattern 2. A value "1.0" designated by an argument P indicates the first designated distance 42. A value "2.0" designated by an argument Q indicates the second designated distance 43. In "M304Q2.0" shown in the block 214, "M304" is a command for setting machining related to the following "G01" command as fixation in the fixing position pattern 1. A value "2.0" indicated by the argument Q indicates the designated distance 41. The block 213 is a block for releasing the setting by the block 212. The block 215 is a block for releasing the setting by the block 213. Note that a command for performing the fixation in a range equivalent to a value passed as the argument Q from an end point can be further defined.

Note that, for simplification, in the example explained above, the block 214 related to the fixing position pattern 1 and the block 212 related to the fixing position pattern 2 are inserted in mixture. However, when the third embodiment is applied to the control apparatuses in the first and second embodiments, only a block related to any one of the fixing position patterns is inserted into one NC program 200.

Note that the machine driving unit 110 can output the processed NC program 211 to the outside. The machine driving unit 110 can stop the wire electric discharge machine without driving the wire electric discharge machine after the processed NC program 211 is generated and drive the wire electric discharge machine on the basis of the processed NC program 211 after an execution command from the user is input. The machine driving unit 110 can receive an input of the NC program 211 edited by the user and drive the wire electric discharge machine on the basis of the received NC program 211.

INDUSTRIAL APPLICABILITY

As explained above, the control apparatus and the machining method for the wire electric discharge machine according to the present invention are suitably applied to a control apparatus that controls a wire electric discharge machine capable of performing machining for fixing a core and a machining method by the wire electric discharge machine.

REFERENCE SIGNS LIST

1 Work
2 Core
21 Approach hole
22 to 27 Blocks
41 Designated distance
42 First designated distance
43 Second designated distance
51 CPU
52 RAM
53 ROM
54 Control program
55 Input device
56 Display device
60 Display screen
61 Box
62 Pull-down menu
63 Legend
100, 100a Control apparatuses
101 NC-program analyzing unit
102 Program-perimeter calculating unit
103 Machining-condition analyzing unit
104 Machining condition database for standard machining
105 Core-weight calculating unit
106, 106a Fixation-condition setting units
107 Machining condition database for fixation
108, 108a Fixing-necessary-distance calculating units
109 Fixing-position calculating unit
110 Machine driving unit
200, 211 NC programs
201 Fixing position pattern designation
202 Machine driving command
203 Core perimeter information
204 Work information
205 Wire/work information
206 Machining conditions for standard machining
207 Core weight information
208 Machining conditions for fixation
209 Fixing distance information
210 Fixing position information
212 to 215 Blocks

The invention claimed is:

1. A control apparatus comprising:
a weight calculating unit that calculates weight of a core on a basis of a machining program for driving a wire electric discharge machine and slicing out the core from a work and a first input from a user designating a material and a thickness of the work;
a distance calculating unit that calculates, on a basis of the weight of the core, a necessary length in which fixation for fixing the core to the work is applied to the work and the core;
a fixing-position setting unit that sets fixing positions in blocks for machining line segments forming an outer periphery of the core such that a total length of portions in which the fixation is applied is the calculated necessary length, the fixation being applied to an outer periphery of the core;
a fixation-condition setting unit that calculates a machining condition setting value for fixation on the basis of the first input; and
a machine driving unit that drives the wire electric discharge machine on the basis of the machining program and performs, while switching machining conditions, machining for causing the wire electric discharge machine to slice out the core and machining for causing the wire electric discharge machine to machine places set in the fixing positions by applying the machining condition setting value.

2. The control apparatus according to claim 1, wherein the fixing-position setting unit receives a second input from the user designating a setting pattern of fixing positions and sets the fixing positions in places corresponding to the setting pattern designated by the received second input.

3. The control apparatus according to claim 2, further comprising a machining condition database for fixation that stores in advance machining conditions for fixation for each of combinations of designated items included in the first input, wherein
the fixation-condition setting unit searches through the machining condition database for fixation using content designated by the first input as a search key to thereby calculate the machining condition setting value.

4. The control apparatus according to claim 2, wherein the fixation-condition setting unit calculates the machining condition setting value on a basis of a numerical formula stored in advance that describes machining conditions for fixation with respective designated items included in the first input set as variables.

5. The control apparatus according to claim 1, wherein the first input is an input further designating a wire type or a wire diameter.

6. The control apparatus according to claim 2, wherein the fixation-condition setting unit calculates the machining condition setting value on a basis of the calculated necessary length.

7. The control apparatus according to claim 2, wherein the distance calculating unit calculates the necessary length according to a fixing force obtained by the machining condition setting value.

8. A machining method for driving a wire electric discharge machine to machine a work on a basis of a machining program for slicing out a core from the work, the machining method comprising:
    a first step of receiving a first input designating a material and a thickness of the work;
    a weight calculating step of calculating a weight of the core on a basis of the machining program and the first input;
    a distance calculating step of calculating, on a basis of the weight of the core, a necessary length in which fixation for fixing the core to the work is applied to the work and the core;
    a fixing-position setting step of setting fixing positions in blocks for machining line segments forming an outer periphery of the core such that a total length of portions in which the fixation is applied is the calculated necessary length, the fixation being applied to an outer periphery of the core;
    a machining-condition setting step of calculating a machining condition setting value for fixation on a basis of the first input; and
    a machining processing step of driving the wire electric discharge machine on a basis of the machining program and performing, while switching machining conditions, machining for causing the wire electric discharge machine to slice out the core and machining for causing the wire electric discharge machine to machine places set in the fixing positions by applying the machining condition setting value.

9. The machining method according to claim 8, further comprising a second input step of receiving a second input designating a setting pattern of fixing positions, wherein in the fixing-position setting step, the fixing positions are set in places corresponding to the setting pattern designated by the second input.

* * * * *